(12) United States Patent
     Kaddouh (10) Patent No.: US 11,135,978 B2
(45) Date of Patent: Oct. 5, 2021

(54) VEHICLE RUNNING BOARD AND INSERT

(71) Applicant: Nissan North America, Inc., Franklin, TN (US)

(72) Inventor: Sam Kaddouh, Grosse Pointe Park, MI (US)

(73) Assignee: Nissan North America, Inc., Franklin, TN (US)

( * ) Notice: Subject to any disclaimer, the term of this patent is extended or adjusted under 35 U.S.C. 154(b) by 71 days.

(21) Appl. No.: 16/520,709

(22) Filed: Jul. 24, 2019

(65) Prior Publication Data

US 2021/0024003 A1    Jan. 28, 2021

(51) Int. Cl.
*B60R 3/00*    (2006.01)
*B60Q 1/32*    (2006.01)
*B60Q 1/00*    (2006.01)

(52) U.S. Cl.
CPC ............ *B60R 3/002* (2013.01); *B60Q 1/0017* (2013.01); *B60Q 1/323* (2013.01)

(58) Field of Classification Search
CPC ................................ B60R 3/002; B60Q 1/323
See application file for complete search history.

(56) References Cited

U.S. PATENT DOCUMENTS

| | | | | |
|---|---|---|---|---|
| 4,544,991 A * | 10/1985 | Gorsuch | ................. | B60R 3/002 280/164.1 |
| 5,005,306 A * | 4/1991 | Kinstler | .................. | G09F 21/04 362/486 |
| 6,354,723 B1 * | 3/2002 | Spence | .................. | B60Q 1/323 280/164.1 |
| 6,439,589 B1 | 8/2002 | Payne | | |
| 6,449,889 B1 * | 9/2002 | Hottenstein | ............... | G09F 7/04 340/473 |
| 7,712,933 B2 * | 5/2010 | Fleischmann | ............ | B60Q 1/50 362/511 |
| 8,408,773 B2 * | 4/2013 | Judge | ....................... | B60Q 1/50 362/605 |
| 9,318,035 B2 * | 4/2016 | Lee | ......................... | G09F 23/00 |
| 2005/0213351 A1 * | 9/2005 | Yang | ....................... | B60Q 1/323 362/633 |
| 2006/0114685 A1 * | 6/2006 | Seeber | .................... | B60R 13/04 362/495 |

(Continued)

OTHER PUBLICATIONS

Running Board Pair Raptor Style Quad Cab Dodge Ram 1500 2009-2017; https://www.cjponyparts.com/running-board-pair-raptor-style-quad-cab-dodge-ram-1500-2009-2017/p/RRBK5/; 2009.

*Primary Examiner* — Erez Gurari
(74) *Attorney, Agent, or Firm* — Young Basile Hanlon & MacFarlane, P.C.

(57) ABSTRACT

A running board for a vehicle is disclosed that includes: a body; a plurality of retainers that are connected to the body so as to collectively define a receiving space; and an insert that is configured for insertion into the receiving space. The body of the running board includes: a deck; an outer flange that extends downwardly from the deck; and an inner flange that extends downwardly from the deck in generally parallel relation to the outer flange. The outer flange includes at least one opening forming a decorative element, and the insert is configured for engagement with the plurality of retainers to thereby secure the insert in generally parallel relation to the outer flange adjacent to the decorative element.

20 Claims, 8 Drawing Sheets

(56) References Cited

U.S. PATENT DOCUMENTS

| | | | | |
|---|---|---|---|---|
| 2006/0176711 A1* | 8/2006 | Wang | ............... | B60R 13/04 |
| | | | | 362/555 |
| 2008/0170405 A1* | 7/2008 | Kamiya | ............ | B60Q 1/323 |
| | | | | 362/495 |
| 2009/0251920 A1* | 10/2009 | Kino | ............... | B60Q 1/323 |
| | | | | 362/602 |
| 2012/0092889 A1* | 4/2012 | Held | ............... | B60Q 1/323 |
| | | | | 362/606 |
| 2013/0335994 A1* | 12/2013 | Mulder | ............ | F21V 9/00 |
| | | | | 362/555 |
| 2014/0119038 A1* | 5/2014 | Mulder | ............ | B21D 28/26 |
| | | | | 362/509 |
| 2015/0233560 A1* | 8/2015 | Cheng | ............ | B60Q 3/64 |
| | | | | 362/612 |
| 2016/0200243 A1* | 7/2016 | Redlich | ........... | G09F 7/00 |
| | | | | 362/23.14 |
| 2017/0106918 A1* | 4/2017 | Diller | ............ | B60R 19/52 |
| 2018/0065559 A1* | 3/2018 | Michie | ........... | B60R 3/002 |
| 2019/0049090 A1* | 2/2019 | Krishnan | ......... | B60Q 1/323 |
| 2019/0301698 A1* | 10/2019 | Dawidziuk | ........ | F21S 41/24 |
| 2019/0359123 A1* | 11/2019 | Dellock | .......... | B60Q 3/217 |
| 2020/0041081 A1* | 2/2020 | Hsiao | ............ | F21S 9/02 |
| 2020/0331396 A1* | 10/2020 | Du | ............... | B60Q 1/323 |

* cited by examiner

FIG. 15

VEHICLE RUNNING BOARD AND INSERT

TECHNICAL FIELD

The present disclosure relates to running boards for vehicles, and, more specifically, to a running board including an insert that enhances the appearance of the running board.

BACKGROUND

Automakers offer a variety of options that allow customers to customize their vehicles. Running boards, for example, not only assist passengers in entering and exiting the vehicle, but present an opportunity to modify the vehicle's overall appearance. The present disclosure expands upon this opportunity by providing a running board that includes a decorative element (e.g., one or more openings or cutouts in the shape of the vehicle's logo), as well as an insert that is connectable to a body of the running board to emphasize (or otherwise enhance) the appearance and/or the visibility of the decorative element.

SUMMARY

In one aspect of the present disclosure, a running board for a vehicle is disclosed. The running board includes: a body; a plurality of retainers that are connected to the body so as to collectively define a receiving space; and an insert that is configured for insertion into the receiving space. The body of the running board includes: a deck; an outer flange that extends downwardly from the deck; and an inner flange that extends downwardly from the deck in generally parallel relation to the outer flange. The outer flange includes at least one opening forming a decorative element, and the insert is configured for engagement with the plurality of retainers to thereby secure the insert in generally parallel relation to the outer flange adjacent to the decorative element.

In certain embodiments, the running board may further include a light source that is positioned adjacent to the insert such that the light source illuminates the insert upon activation.

In certain embodiments, the insert may include: an outer wall; a pair of side walls that extend from the outer wall along a length of the insert; and a pair of end walls that extend from the outer wall along a width of the insert so as to connect the pair of side walls.

In certain embodiments, the insert may include at least one rib that extends from at least one of the end walls.

In certain embodiments, the at least one rib may include a deformable material such that the at least one rib is deformed upon insertion of the insert into the receiving space to thereby frictionally secure the insert in the receiving space.

In certain embodiments, the pair of end walls may include a first end wall and a second end wall that is positioned opposite the first end wall.

In certain embodiments, the at least one rib may include a first rib that extends from the first end wall and a second rib that extends from the second end wall.

In certain embodiments, the insert and the plurality of retainers may be configured such that the insert is vertically insertable into (and removable from) the receiving space via movement along an insertion axis that extends in generally parallel relation to a height of the running board during engagement with (and disengagement from) the plurality of retainers.

In certain embodiments, the insert may include an upper end portion and a lower end portion.

In certain embodiments, the upper end portion may be positionable adjacent to the deck upon connection of the insert to the body of the running board.

In certain embodiments, the width of the insert may increase from the upper end portion to the lower end portion.

In certain embodiments, the insert may include a tapered transverse cross-sectional configuration, and the receiving space may be correspondingly tapered to prevent incorrect (e.g., inverted) insertion of the insert into the receiving space.

In certain embodiments, the end walls of the insert may be generally trapezoidal in configuration.

In certain embodiments, the running board may further include at least one fastener that is configured to secure the insert in relation to the plurality of retainers.

In certain embodiments, the insert and the plurality of retainers may be configured such that the insert is horizontally insertable into (and removable from) the receiving space via movement along an insertion axis that extends in generally parallel relation to a length of the running board during engagement with (and disengagement from) the plurality of retainers.

In another aspect of the present disclosure, an insert that is configured for connection to a running board of a vehicle is disclosed. The insert includes: an outer wall; a pair of side walls that extend from the outer wall along a length of the insert; and a pair of end walls that extend from the outer wall along a width of the insert so as to connect the pair of side walls.

In certain embodiments, the outer wall, the side walls, and the end walls may collectively define a cavity.

In certain embodiments, the insert may include at least one rib that extends along a peripheral portion thereof.

In certain embodiments, the at least one rib may include a deformable material such that the at least one rib is deformed upon connection of the insert to the running board to thereby frictionally secure the insert to the running board.

In certain embodiments, the at least one rib may include a pair of ribs that extend from the end walls.

In certain embodiments, the insert may include a lower end portion and an upper end portion.

In certain embodiments, the upper end portion may be configured for positioning adjacent to the running board upon connection of the insert to the running board.

In certain embodiments, the insert may be tapered in configuration such that the width of the insert increases from the upper end portion to the lower end portion.

In certain embodiments, the insert may further include a light source that is positioned within the cavity such that the light source illuminates the insert upon activation.

In another aspect of the present disclosure, an illuminated running board for a vehicle is disclosed. The illuminated running board includes: a body having a deck and a flange; an insert defining a cavity; and a light source that is positionable within the cavity. The flange extends downwardly from the deck and includes at least one opening forming a decorative element, and the insert extends in generally parallel relation to the flange.

In certain embodiments, the body may further include a plurality of retainers collectively defining a receiving space that is configured to receive the insert such that the insert is engageable with the plurality of retainers to secure the insert in relation to the body.

In certain embodiments, the insert may include at least one rib extending along a peripheral portion thereof.

In certain embodiments, the at least one rib may include a deformable material such that the at least one rib is deformed upon insertion of the insert into the receiving space to thereby frictionally secure the insert in the receiving space.

BRIEF DESCRIPTION OF THE DRAWINGS

According to common practice, the various features of the drawings may not be to scale, and may be arbitrariltiy expanded or reduced for clarity.

DETAILED DESCRIPTION

The present disclosure describes running boards for vehicles that include a decorative element (e.g., one or more openings or cutouts in the shape of the vehicle's logo), as well as inserts that are connectable to the running boards so as to emphasize (or otherwise enhance) the appearance and/or the visibility of the decorative element. To further emphasize (or otherwise enhance) the appearance and/or the visibility of the decorative element, in certain embodiments, a light source may be provided to illuminate the insert, and, thus, the decorative element, upon activation.

The running board includes a plurality of retainers (e.g., pillars, brackets, etc.) that collectively define a receiving space for the insert. In certain embodiments, the insert includes one or more (crush) ribs that are deflected (or otherwise deformed) upon connection of the insert to the running board to thereby secure the position of the insert via an interference (friction) fit. To further secure the insert, it is also envisioned that one or more fasteners may be employed. To inhibit (or entirely prevent) incorrect (e.g., inverted) insertion of the insert into the receiving space, in certain embodiments, the insert and the receiving space may be correspondingly tapered.

Figure 1:
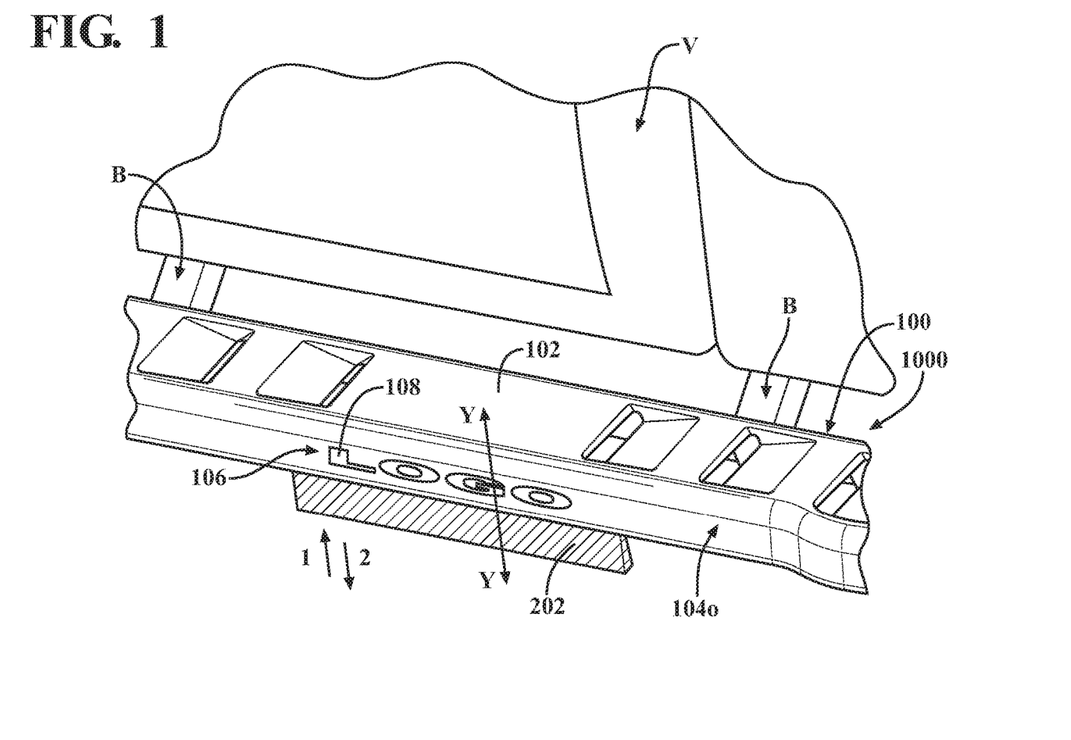
FIG. 1 is a top, perspective view of a running board including an insert according to the principles of the present disclosure shown prior to connection of the insert.
Figure 2:
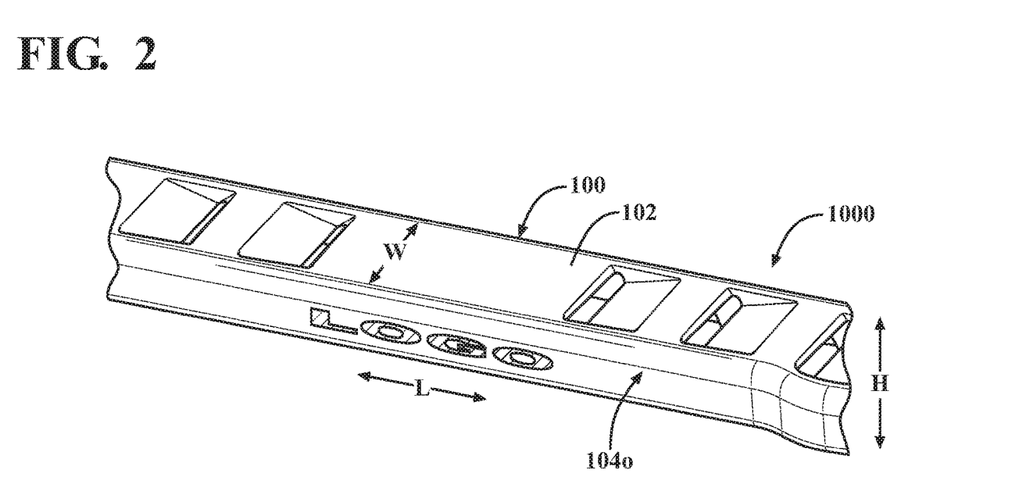
FIG. 2 is a top, perspective view of the running board and the insert shown after connection of the insert.

With reference to FIG. 1, a vehicle V (e.g., a sport utility vehicle, a pickup truck, or the like) that includes a pair of running boards 1000 is illustrated. The running boards 1000 are connected to an underside of the vehicle V via braces B, and assist passengers during entry into and exit from the vehicle V. While a single running board 1000 is shown throughout the figures and described below, it should be understood that the vehicle V may include one or more additional running boards 1000 in various embodiments of the disclosure (i.e., such that the vehicle V includes one or more running boards 1000 on each of the driver's side and the passenger's side).

Referring to FIGS. 2-6 as well, the running board 1000 includes a body 100 and an insert 200 that is connectable to the body 100. The running board 1000 may include (e.g., may be formed partially or entirely from) any suitable material or combination of materials, such as, for example, aluminum, steel, etc., and may be formed through any suitable manufacturing process, such as, for example, machining, casting, etc.

The body 100 of the running board 1000 defines a length L (FIG. 2), a width W, and a height H, and includes a deck (step) 102, an inner flange 104$i$ that extends downwardly from the deck 102, and an outer flange 104$o$ that extends downwardly from the deck 102 in generally parallel relation to the inner flange 104$i$. Although the flanges 104$i$, 104$o$ are illustrated as extending in generally orthogonal relation to the deck 102, it should be appreciated that the particular orientation of the flanges 104$i$, 104$o$ in relation to the deck 102 may be varied in alternate embodiments of the disclosure. For example, it is envisioned that the flanges 104$i$, 104$o$ may extend at an angle to the deck 102 such that the body 100 includes a flared configuration. The outer flange 104$o$ incorporates a decorative element 106 that includes (e.g., is defined by) one or more openings (cutouts) 108 that extend through the outer flange 104$o$, which may be formed in any suitable manner, such as, for example, stamping, CNC machining, etc. Although illustrated in the configuration of the logo for the vehicle V, it should be appreciated that the decorative element 106 and the opening(s) 108 may be formed and arranged so as to create any desired aesthetic impression for the decorative element 106.

The running board 1000 also includes a series of retainers 110 (FIGS. 3, 4) that are connected to the body 100. In various embodiments of the disclosure, it is envisioned that the retainers 110 may be integrally (e.g., monolithically) formed with the body 100, or, alternatively, that the body 100 and the retainers 110 may be formed as separate, discrete structures that are connected through the use of an adhesive, via welding, through the employ of one or more mechanical fasteners (e.g., screws, rivets, etc.), or in any other suitable manner.

In the embodiment of the disclosure seen in FIGS. 1-5, the retainers 110 are configured as pillars 112 that extend from an underside 114 (FIG. 3) of the deck 102. Although shown as including three pillars 112$i$, 112$ii$, 112$iii$, it should be appreciated that the particular number of pillars 112 may be varied in alternate embodiments of the disclosure (e.g., depending on the vehicle V, the configuration of the running board 1000, the configuration of the insert 200, etc.).

The pillar 112*i* includes an outer face 116*ai*, an inner face 116*bi*, and end faces 116*ci*, 116*di*. In the illustrated embodiment, the end faces 116*ci*, 116*di* are angled towards one another such that the pillar 112*i* includes a generally tapered cross-sectional configuration. It should be appreciated, however, that in alternate embodiments of the disclosure, the end faces 116*ci*, 116*di* may extend in generally parallel relation. The end face 116*ci* extends beyond the outer face 116*ai* (along the width W of the running board 1000) so as to define a shoulder 118*i*, whereby the pillar 112*i* includes a non-uniform outer profile.

The pillar 112*ii* includes an outer face 116*aii*, an inner face 116*bii*, and end faces 116*cii*, 116*dii*. In the illustrated embodiment, the end faces 116*cii*, 116*dii* are angled towards one another such that the pillar 112*ii* includes a generally tapered cross-sectional configuration. It should be appreciated, however, that in alternate embodiments of the disclosure, the end faces 116*cii*, 116*dii* may extend in generally parallel relation. The end face 116*cii* extends beyond the outer face 116*aii* (along the width W of the running board 1000) so as to define a shoulder 118*ii*, whereby the pillar 112*ii* includes a non-uniform outer profile. The pillars 112*i*, 112*ii* are, thus, identical but for the orientation of the respective shoulders 118*i*, 118*ii*.

The pillar 112*iii* includes an outer face 116*aiii*, an inner face 116*biii*, and end faces 116*ciii*, 116*diii*. In the illustrated embodiment, the end faces 116*ciii*, 116*diii* are angled towards one another such that the pillar 112*iii* includes a generally tapered cross-sectional configuration. It should be appreciated, however, that in alternate embodiments of the disclosure, the end faces 116*ciii*, 116*diii* may extend in generally parallel relation. In contrast to the pillars 112*i*, 112*ii*, the outer face 116*aiii* of the pillar 112*iii* is generally flush with the end faces 116*ciii*, 116*diii*, whereby the pillar 112*iii* includes a generally uniform outer profile.

The pillars 112 collectively define a receiving space 120 (FIGS. 4, 6) that is configured to accommodate the insert 200 such that the insert 200 is positioned in generally parallel relation to the outer flange 104*o* of the running board 1000. As discussed in further detail below, the receiving space 120 and the insert 200 are configured in correspondence with one another so as to inhibit (or entirely prevent) incorrect (e.g., inverted) insertion of the insert 200 into the receiving space 120 and/or facilitate securement of the insert 200 to the body 100 of the running board 1000.

In the illustrated embodiment, the pillars 112*i*, 112*ii* are illustrated as being generally aligned along the length L of the running board 1000, and the pillar 112*iii* is illustrated as being offset from (i.e., out of alignment with) the pillars 112*i*, 112*ii* (e.g., the pillar 112*iii* is in closer proximity to the outer flange 104*o* than the pillars 112*i*, 112*ii*). It should be appreciated, however, that the particular position of one or more of the pillars 112 may be varied in alternate embodiments of the disclosure. For example, it is envisioned that each of the pillars 112*i*, 112*ii*, 112*iii* may be aligned along the length L of the running board 1000, or, alternatively, that each of the pillars 112*i*, 112*ii*, 112*iii* may be misaligned (i.e., positioned in different locations along the width W of the running board 1000).

Figure 3:
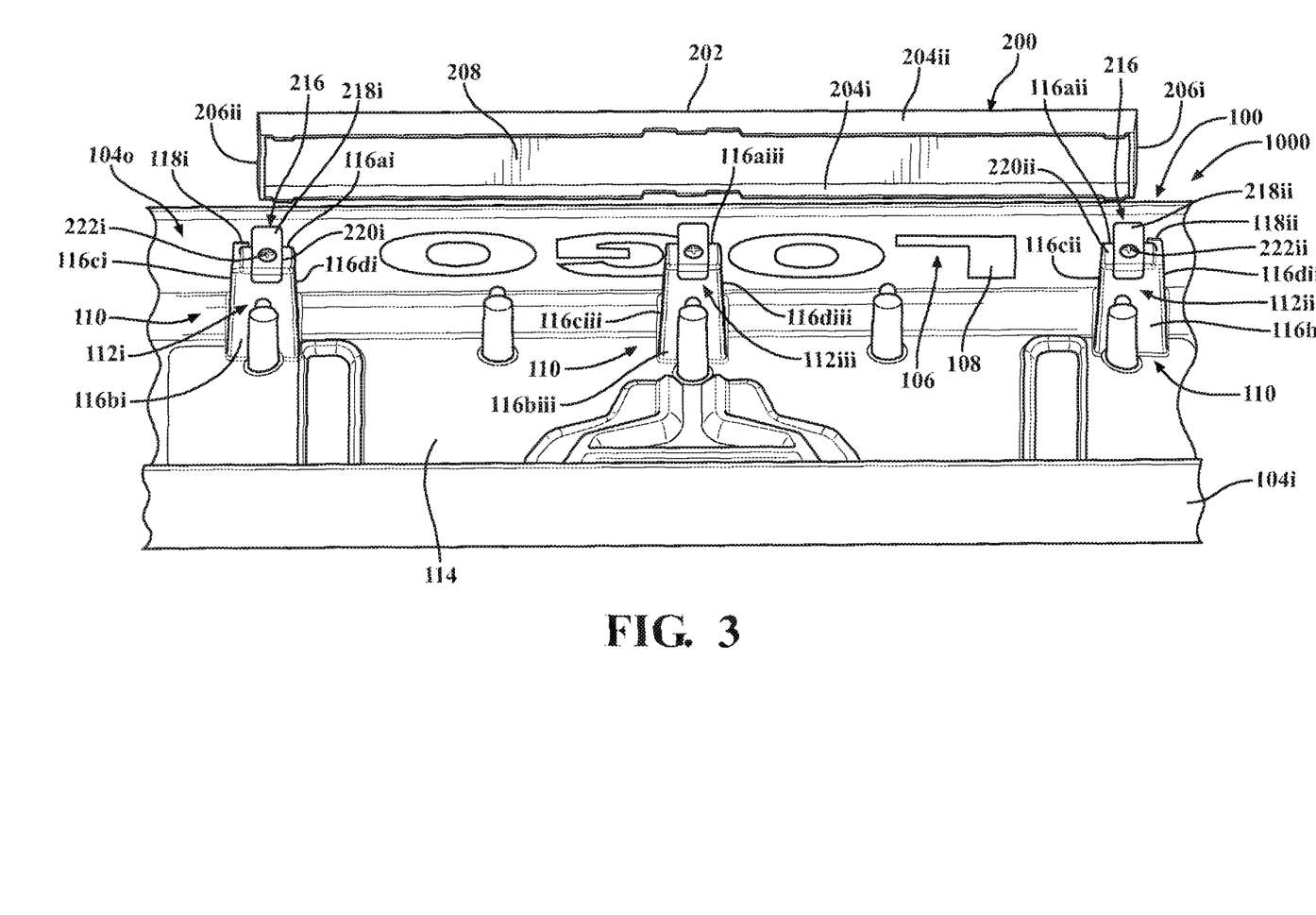
FIG. 3 is a bottom, perspective view of the running board and the insert shown prior to connection of the insert.

With continued reference to FIGS. 1-6, the insert 200 will be discussed. The insert 200 is connectable to the body 100 of the running board 1000 via the retainers 110, as will be described in further detail below, and is configured for positioning within the receiving space 120 (FIGS. 4, 6) such that the insert 200 is secured beneath the deck 102 (FIGS. 1, 2) and between the flanges 104*i*, 104*o* (FIG. 3). When so positioned, the insert 200 is visible through the openings 108 of the decorative element 106, thereby providing contrast to emphasize (or otherwise enhance) the appearance and/or the visibility of the decorative element 106. In certain embodiments of the disclosure, it is envisioned that the insert 200 may include any desired coloration to provide further emphasis (or other such enhancement) to the decorative element 106.

The insert 200 may include (e.g., may be formed partially or entirely from) any suitable material, such as, for example, plastic or polymeric materials (e.g., polypropylene), metallic materials, carbon fiber, etc., and may be formed through any suitable method of manufacture, such as, for example, molding, stamping, 3-D printing, etc. The insert 200 defines a length Li (FIG. 6), a width Wi, and a height Hi, and includes an outer (front) panel 202, a pair of opposing (upper and lower) side walls 204*i*, 204*ii* that extend away (rearwardly) from the outer panel 202 along the length Li of the insert 200, and a pair of opposing (left and right) end walls 206*i*, 206*ii* that extend away (rearwardly) from the outer panel 202 along the width Wi of the insert 200 so as to connect the side walls 204*i*, 204*ii*. Although shown throughout the figures as being integrally (e.g., monolithically) formed, it should be appreciated that, in alternate embodiments of the disclosure, the various components of the insert 200 may be formed separately and attached to each other (e.g., via an adhesive, welding, etc.).

Figure 4:
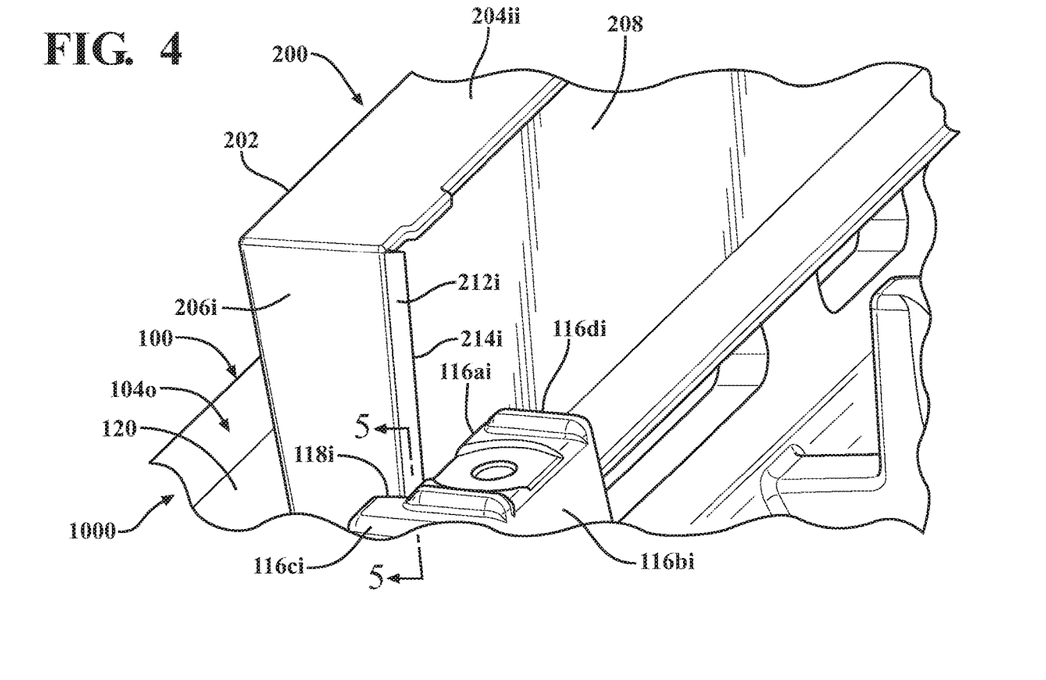
FIG. 4 is a partial, side, perspective view illustrating connection of the insert.
Figure 6:
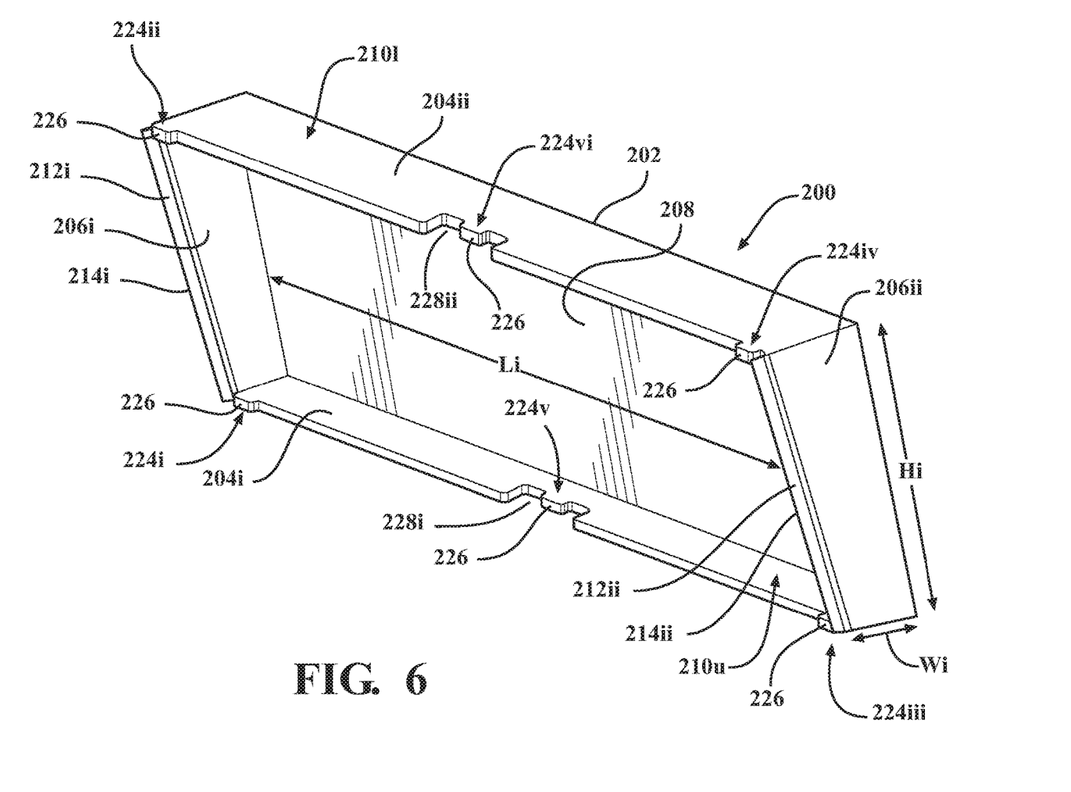
FIG. 6 is a rear, perspective view of the insert.

As seen in FIGS. 3, 4, and 6, for example, in certain embodiments, the insert 200 may include a cavity 208 that is collectively defined by the outer panel 202 wall, the side walls 204*i*, 204*ii*, and the end walls 206*i*, 206*ii*. Alternatively, however, it is envisioned that the insert 200 may further include an inner (rear) panel (not shown) to enclose the cavity 208, or that the insert 200 may be formed as a block of material, whether solid or otherwise. For example, in such embodiments, it is envisioned that the insert 200 may include a series of openings or apertures (e.g., a honeycomb structure), slits, or the like (e.g., to reduce the weight of the insert 200).

Figure 5:
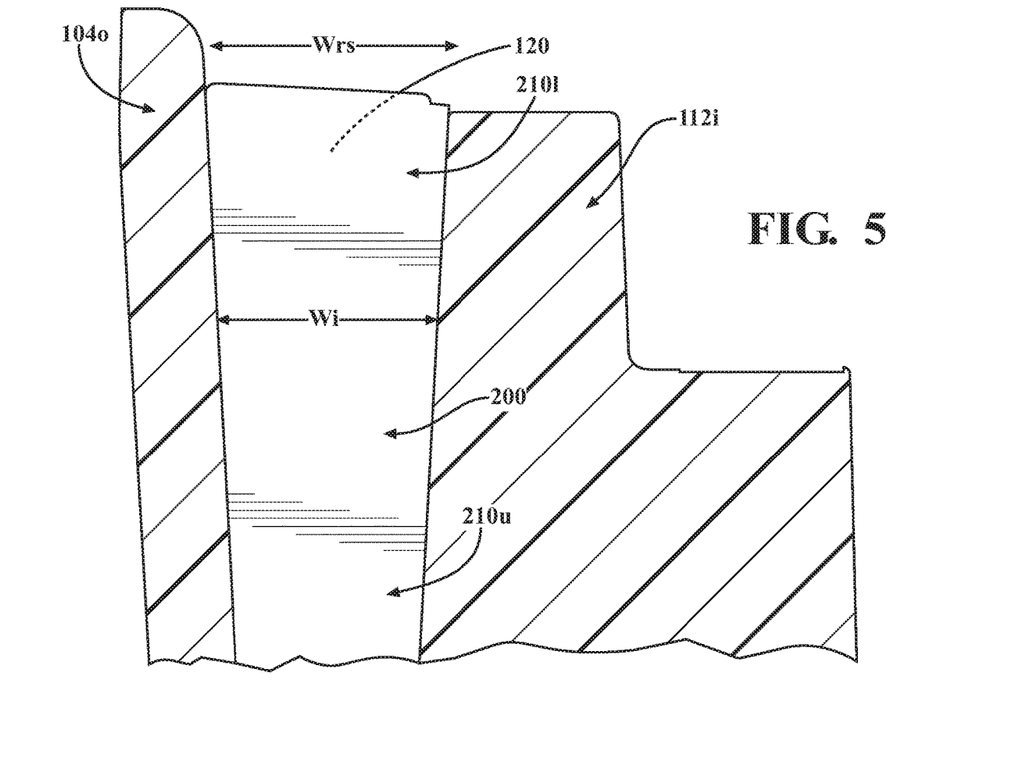
FIG. 5 is a cross-sectional view of the insert and the running board taken through line 5-5 in FIG. 4.

The insert 200 includes an upper end portion 210*u* that is positionable adjacent to the deck 102 of the running board 1000, and an opposite lower end portion 210*l*. The insert 200 includes a tapered cross-sectional configuration, as seen in FIGS. 5 and 6, whereby the width Wi of the insert increases from the upper end portion 210*u* to the lower end portion 210*l* so as to impart a generally trapezoidal configuration to the end walls 206*i*, 206*ii*. Although shown as tapering uniformly between the upper end portion 210*u* and the lower end portion 210*l*, in alternate embodiments, it is envisioned that the taper of the insert 200 may vary between the respective end portions 210*u*, 210*l*.

As mentioned above, the configuration of the insert 200 corresponds to that of the receiving space defined by the retainers 110 (e.g., the pillars 112). More specifically, as seen in FIG. 5, for example, the receiving space 120 defines a taper that approximates (e.g., matches) that defined by the insert 200, whereby the receiving space 120 includes a width Wrs that narrows towards the deck 102. The corresponding tapers of the insert 200 and the receiving space 120 allow for complete reception of the insert 200 in a single orientation only, thereby frustrating any attempt at improper (e.g., inverted) insertion of the insert 200 into the receiving space 120 during connection of the insert 200 to the body 100 of the running board 1000. More specifically, inverted insertion of the insert 200 would cause the lower end portion 210*l* of the insert 200 to contact the retainers 110 and/or the outer flange 104*o* of the running board 1000, thereby preventing any further advancement of the insert 200.

Figure 7:
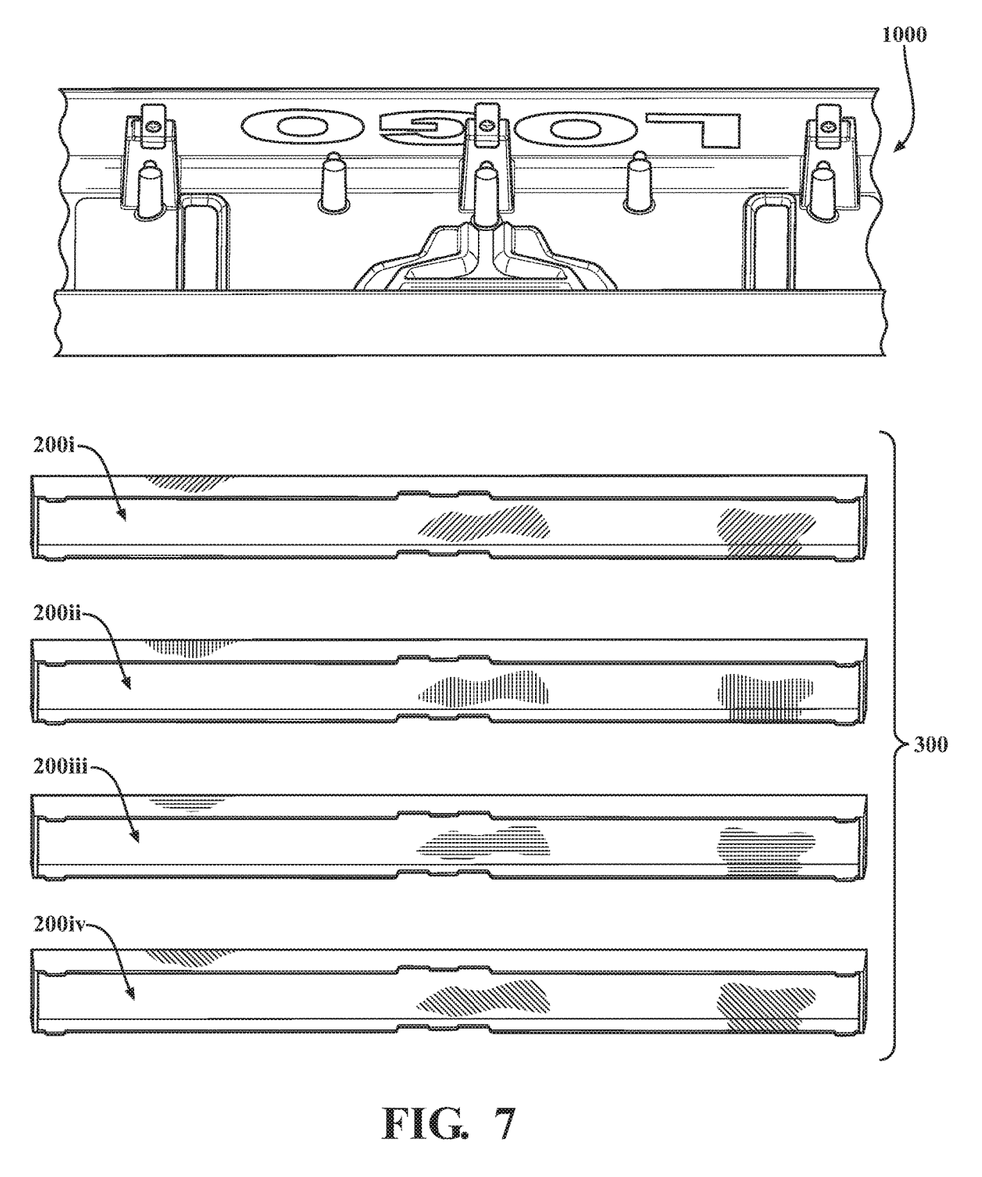
FIG. 7 illustrates a kit including a plurality of inserts for use with the running board.

In certain embodiments, it is envisioned that the insert 200 and the receiving space 120 may be configured to facilitate removable insertion of the insert 200. For example, it is envisioned that the insert 200 may be removable from the receiving space 120 for inspection, repair, or replacement. It is also envisioned, however, that the removability of the insert 200 may facilitate use with a variety of inserts 200 to vary the overall appearance of the running board 1000. For example, the insert 200 may be a component of a kit 300 (FIG. 7) comprising a variety of inserts 200 including different materials, coloration, etc. Illustratively, in the embodiment of the kit 300 seen in FIG. 7, whereas the inserts 200i, 200ii may include (e.g., may be formed partially or entirely from) differently colored polypropylene, the insert 200iii may be formed from a metallic material (e.g., steel in a diamond plate pattern), and the insert 200iv may include (e.g., may be formed partially or entirely from) carbon fiber. It should be appreciated that the variety of options described hereinabove are provided for the purpose of illustration only, and that the configuration and/or appearance of the insert(s) 200 included in the kit 300 may be varied in any desired manner in alternate embodiments of the present disclosure.

With particular reference to FIGS. 4 and 6, in certain embodiments, the insert 200 may include one or more ribs 212 that extend along a peripheral portion thereof to facilitate securement of the insert 200 to the running board 1000. In the illustrated embodiment, for example, the insert 200 includes a pair of opposing (first and second) ribs 212i, 212ii (e.g., flanges, projections, or the like) that extend from the end walls 206i, 206ii, respectively. Although shown throughout the figures as being integrally (e.g., monolithically) formed with the end walls 206i, 206ii, in certain embodiments, it is envisioned that the ribs 212i, 212ii may be formed as separate, discrete structures that are connected to the respective end walls 206i, 206ii, such as, for example, via welding, through the use of an adhesive, etc.

Although shown throughout the figures as extending from the end walls 206i, 206ii, it should be appreciated that the specific location and/or number of the ribs 212 may be varied in alternate embodiments without departing from the scope of the present disclosure. For example, based upon the particular configuration and/or orientation of the retainers 110, it is envisioned that the insert 200 may include one or more ribs 212 that extend from the side walls 204i, 204ii, either in addition to or instead of the end walls 206i, 206ii.

The rib(s) 212 include (e.g., are formed partially or entirely from) a deformable material, which may be either the same material from which the insert 200 is formed, or a different material. During positioning of the insert 200 within the receiving space 120, as the insert 200 is advanced towards the deck 102 (FIGS. 1, 2) of the running board 1000, the rib(s) 212 deflect, crush, or otherwise deform, thereby creating an interference (friction) fit with the retainers 110 and (removably) securing the insert 200 to the running board 1000 within the receiving space 120. More specifically, in the illustrated embodiment, the rib 212i is configured for engagement (contact) with the outer face 116ai of the pillar 112i, and the rib 212ii is configured for engagement (contact) with the outer face 116aii (FIG. 3) of the pillar 112ii.

In certain embodiments, it is envisioned that the material forming the rib(s) 212 may be adapted for either resilient or non-resilient deformation. For example, it is envisioned that the material forming the rib(s) 212 may return to its initial (non-deformed) configuration upon separation of the insert 200 from the running board 1000.

To further facilitate deformation (deflection) of the ribs 212, as seen in FIG. 4, for example, it is envisioned that the ribs 212 may include a tapered cross-sectional configuration. More specifically, in the illustrated embodiment, the ribs 212i, 212ii taper towards respective leading edges 214i, 214ii that are positioned opposite the outer (front) panel 202. Alternatively, however, it is envisioned that the taper may be eliminated from the ribs 212 such that the ribs 212 include a generally uniform (e.g., rectangular) cross-sectional configuration.

To enhance securement of the insert 200 to the body 100 of the running board 1000, in certain embodiments, it is envisioned that the running board 1000 may include one or more mechanical fasteners 216, as seen in FIG. 3. For example, in the illustrated embodiment, the fasteners 216 are configured as clips 218 that are mechanically secured to the pillars 112. More specifically, the running board 1000 includes a first clip 218i that is secured to a lower surface 220i of the pillar 112i via a screw 222i, and a second clip 218ii that is secured to a lower surface 220ii of the pillar 112ii via a screw 222ii. It should be appreciated, however, that the particular number, configuration, and/or location of the fastener(s) 216 may be varied in alternate embodiments without departing from the scope of the present disclosure. For example, although depicted as screws 222 in FIG. 3 (e.g., to permit removal of the insert 200), alternatively, it is envisioned that the fastener(s) 216 may instead include (non-removable) rivets or the like. Additionally, while shown as extending from (e.g., as being connected to) the pillars 112i, 112ii, it should be appreciated that the fastener(s) 216 may be positioned in any suitable location. For example, an embodiment in which the fastener(s) 216 extend from (e.g., are connected to) the outer flange 104o of the running board 1000 would not be beyond the scope of the present disclosure.

With reference now to FIGS. 3, 4, and 6, in certain embodiments, the insert 200 may include a series of spacers 224 (e.g., teeth 226) that are configured for engagement with the retainers 110. In the illustrated embodiment of the disclosure, the insert 200 includes: (first and second) spacers 224i, 224ii that extend from the (upper and lower) side walls 204i, 204ii, respectively, so as to engage the outer face 116ai of the pillar 112i; (third and fourth) spacers 224iii, 224iv that extend from the (upper and lower) side walls 204i, 204ii, respectively, so as to engage the outer face 116aii (FIG. 3) of the pillar 112ii; and (fifth and sixth) spacers 224v, 224vi that extend from the (upper and lower) side walls 204i, 204ii, respectively, so as to engage the outer face 116aiii (FIG. 3) of the pillar 112iii. It should be appreciated, however, that the number of spacers 224 included on the insert 200 may be varied in alternate embodiments without departing from the scope of the present disclosure. Additionally, although shown as being identical in configuration, in certain embodiments, it is envisioned that one or more of the spacers 224 may include a dissimilar configuration (e.g., to accommodate variations in the configuration and/or location of one or more of the retainers 110).

Although shown as being integrally (e.g., monolithically) formed with the side walls 204i, 204ii, in certain embodiments, it is envisioned that the spacers 224 may be formed as separate, discrete structures that are connected to the side walls 204i, 204ii, such as, for example, via welding, through the use of an adhesive, etc.

As mentioned above, in the illustrated embodiment, the pillar 112iii is out of alignment with the pillars 112i, 112ii. As such, to facilitate contact between the spacers 224v, 224vi and the pillar 112iii, the spacers 224v, 224vi extend from recessed portions 228i, 228ii (FIG. 6) of the side walls 204i, 204ii, respectively, whereby the spacers 224i, 224iii and the spacers 224ii, 224iv are aligned along the length L of the running board 1000, and the spacers 224v, 224vi are offset from (i.e., are out of alignment with) the spacers 224i, 224iii and the spacers 224ii, 224iv, respectively. It should be appreciated, however, that the number of recessed portions 228 included on (defined by) the insert 200 may be increased or decreased in alternate embodiments of the disclosure. For example, in those embodiments in which each of the pillars 112i, 112ii, 112iii may be aligned along the length L of the running board 1000, the recessed portions 228 may be eliminated altogether such that the spacers 224i, 224iii, 224v and the spacers 224ii, 224iv, 224vi are aligned along the longitudinal axis L of the running board 1000.

The spacers 224 are configured to ensure proper positioning of the insert 200 relative to the outer flange 104o of the running board 1000. More specifically, in the illustrated embodiment, the spacers 224 are configured such that the insert 200 is positioned generally flush with (e.g., within ½ mm of) the outer flange 104o to reduce separation between the insert 200 and the decorative element 106. It should be appreciated, however, that the particular configuration of the spacers 224 may be varied in alternate embodiments to create any desirable effect. For example, it is envisioned that the size of the spacers 224 may be increased in certain embodiments to thereby increase the spacing between the insert 200 and the outer flange 104o to create a shadowy effect.

With reference now to FIGS. 1-6, assembly of the running board 1000 will be discussed. In the illustrated embodiment, the insert 200 is positioned within (and removed from) the receiving space 120 via (vertical) advancement (and withdrawal) towards (and away from) the deck 102 (FIGS. 1, 2) of the running board 1000 (i.e., in the directions indicated by arrows 1 and 2) along an insertion (and removal) axis Y that extends in generally parallel relation to the height H (FIG. 2) of the running board 1000. Due to the tapered configurations of the insert 200 and the receiving space 120, upon sufficient advancement of the insert 200, the ribs 212i, 212ii (FIGS. 4, 6) are caused to engage the outer faces 116ai, 116aii (FIG. 3) of the pillars 112i, 112ii, respectively, which results in deflection, crushing, or other such deformation of the ribs 212i, 212ii so as to create an interference (friction) fit with the pillars 112i, 112ii, thereby securing the insert 200 to the running board 1000. Additionally, advancement of the insert 200 into the receiving space 120 results in positioning of the ribs 212i, 212ii adjacent to the shoulders 118i, 118ii (FIGS. 3, 4) respectively defined by the end faces 116ci, 116cii of the pillars 112i, 112ii, which restricts (if not entirely prevents) lateral (side-to-side) movement of the insert 200 along the length L of the running board 1000. In certain embodiments, for example, it is envisioned that the pillars 112i, 112ii and the ribs 212i, 212ii may be configured such that the insert 200 is laterally movably within the receiving space 120 through a range of motion that lies substantially within the range of approximately 1 mm to approximately 5 cm (e.g., to allow for manufacturing tolerances, to reduce the complexity of assembly, etc.), although a greater range of motion would not be beyond the scope of the present disclosure.

Following complete advancement of the insert 200 into the receiving space 120 (e.g., such that the upper end portion 210u (FIG. 6) of the insert 200 is positioned adjacent to or in contact with the underside 114 (FIG. 3) of the deck 102 of the running board 1000), in those embodiments including the fasteners 216, the fasteners 216 may be connected to the running board 1000 (e.g., to the pillars 112) to further secure the insert 200 in relation to the running board 1000. The position of the insert 200 relative to the running board 1000 may thus be maintained via: engagement of the ribs 212 with the pillars 112; mating engagement between the body 100 of the running board 1000 established by the corresponding tapers of the insert 200 and the receiving space 120; engagement of the spacer(s) 224 with the pillars 112; and/or securement of the fastener(s) 216.

Figure 8:
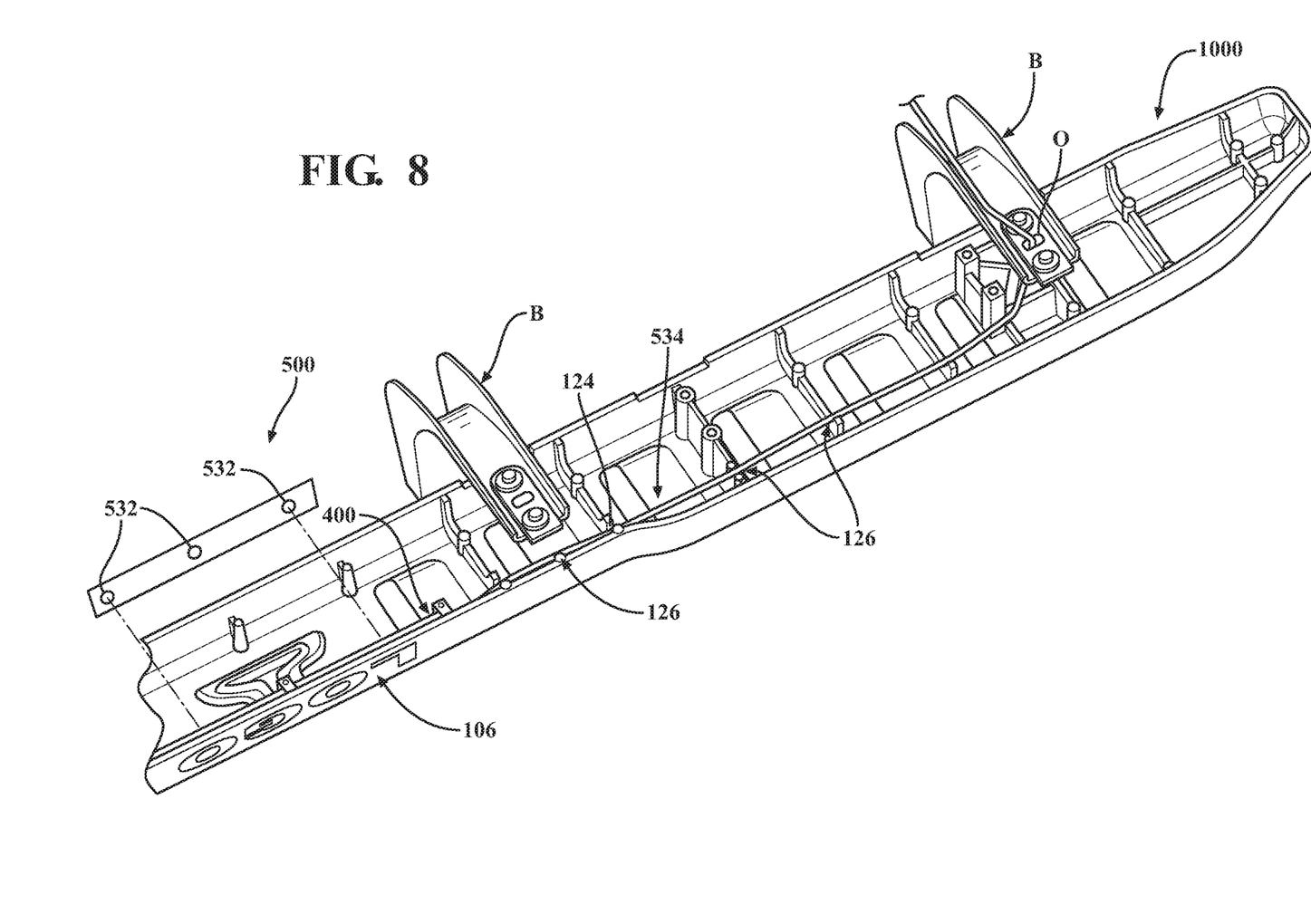
FIG. 8 is a bottom, perspective view of an alternate embodiment of the running board including a light source and a wiring harness to permit illumination of the insert.

With reference now to FIG. 8, an alternate embodiment of the insert 200 (identified by the reference character 400) will be discussed. The insert 400 is identical to the insert 200 discussed above but for the differences described below, and, as such, in the interest of brevity, will be described only with respect to those differences.

The insert 400 is formed (either partially or entirely from) a diaphanous (or otherwise light-permeable) material (e.g., a clear material, a translucent material, etc.) so as to allow for illumination of the insert 400, and, thus, the decorative element 106, by a light source 500 that is positioned adjacent to (e.g., in contact with) the insert 400 (e.g., within the aforedescribed cavity of the insert 400). In certain embodiments, it is envisioned that the light source 500 may also be configured to create downlight (or other such ambient illumination) to assist in location of the vehicle V (FIG. 1), entry into the vehicle V, etc.

It is envisioned that the light source 500 may be a standalone component, a component of the running board 1000, or a component of the insert 400. For example, in the illustrated embodiment, the light source 500 includes one or more LED bulbs 532, which are shown separated from the insert 400 for clarity. The light source 500 is connected to a power source (not shown) in the vehicle V (FIG. 1) by a wiring harness 534. In certain embodiments, for example, it is envisioned that the light source 500 may be electrically connected to one or more doors of the vehicle V such that the light source 500 may be activated and deactivated via opening and closing (or unlocking and locking) of the doors (e.g., in a manner similar to an interior dome light of the vehicle V).

As seen in FIG. 8, the wiring harness 534 may be routed about a periphery of the running board 1000 (e.g., to avoid entanglement or contact with other component(s) of the vehicle V). In the illustrated embodiment, for example, the wiring harness 534 extends from the insert 400 through a channel 124, and through an opening O in the brace(s) B. To restrict unintended movement of the wiring harness 534, it is envisioned that the running board 1000 may include one or more catches 126 (e.g., hooks, clasps, fasteners, or the like), which may be either integrally formed with the running board 1000, or secured thereto (e.g., in the form of a zip-tie).

Figures 9, 10:
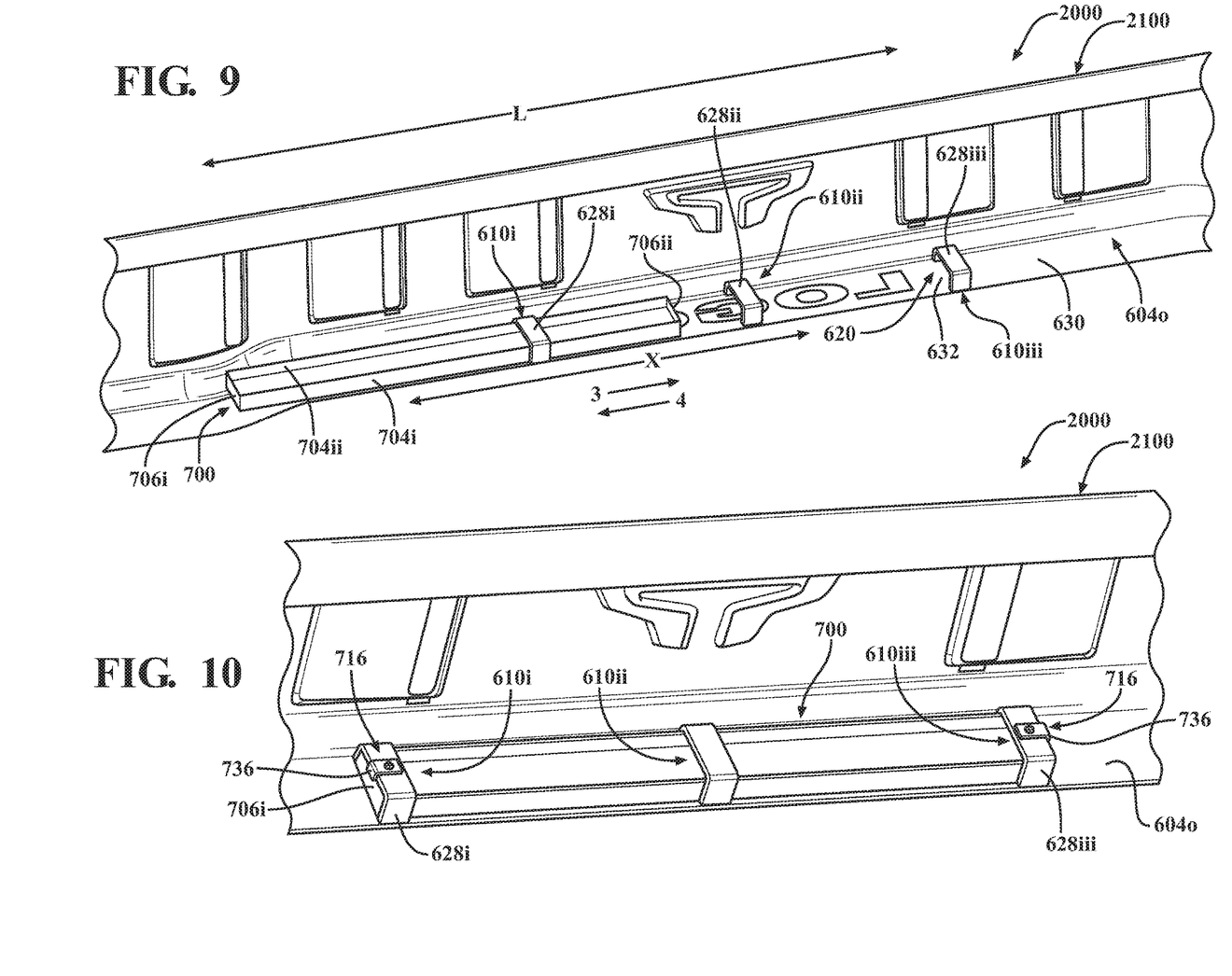
FIG. 9 is a bottom, perspective view of an alternate embodiment of the running board shown during connection of the insert.
FIG. 10 is a bottom, perspective view of the running board and the insert seen in FIG. 7 after connection of the insert.

With reference now to FIGS. 9 and 10, alternate embodiments of the running board 1000 and the insert 200 (identified by the reference characters 2000 and 700, respectively) will be discussed. The running board 2000 and the insert 700 are identical to the running board 1000 and the insert 200 discussed above but for the differences described below, and, as such, in the interest of brevity, will be described only with respect to those differences.

As with the running board 1000, the running board 2000 includes a series of retainers 610 that are connected to a body 2100 of the running board 2000, which may be either integrally (e.g., monolithically) formed therewith, or formed as separate, discrete structures that can be connected to the body 2100 through the use of an adhesive, via welding, through the employ of one or more mechanical fasteners (e.g., screws, rivets, etc.), or in any other suitable manner.

The retainers 610 are configured as brackets 628 that extend from an inner surface 630 of an outer flange 604o of the running board 2000 so as to collectively define a receiving space 620 (e.g., a channel 632) that extends along a length L of the running board 2000. Although shown as including three brackets 628i, 628ii, 628iii, it should be appreciated that the particular number of brackets 628 may be varied in alternate embodiments of the disclosure (e.g., depending on the vehicle V, the configuration of the running board 2000, the configuration of the insert 700, etc.).

In contrast to the insert 200 (FIGS. 1-6), the insert 700 is non-tapered, and is positioned within (and removed from) the receiving space 120 (e.g., the channel 632) via horizontal advancement (and withdrawal) along an insertion (and removal) axis X that extends in generally parallel relation to the length L of the running board 2000 (i.e., in the directions indicated by arrows 3 and 4) such that the insert 700 is positioned in generally parallel relation to the outer flange 604o of the running board 2000. To secure the insert 700 within the receiving space 620, and inhibit (if not entirely prevent) unintended movement of the insert 620, mechanical fasteners 716 may be utilized. In the illustrated embodiment, for example, the fasteners 716 are shown as being connected to the brackets 628i, 628iii and as including flanges 736 that extend towards the outer flange 604o of the running board 2000 so as to facilitate contact with end walls 706i, 706ii of the insert 700, respectively. It should be appreciated, however, that the particular number, configuration, and/or location of the fastener(s) 716 may be varied in alternate embodiments without departing from the scope of the present disclosure. For example, it is envisioned that the fastener(s) 716 may instead extend from the outer flange 604o of the running board 2000.

As seen in FIGS. 9 and 10, the insert 700 is devoid of both the ribs 212 and the spacers 224 discussed above in connection with the insert 200 (FIGS. 1-6). As such, the end walls 706i, 706ii of the insert 200 are generally uniform in height, as are side walls 704i, 704ii of the insert 200, which extend between the end walls 706i, 706ii.

Figure 11:
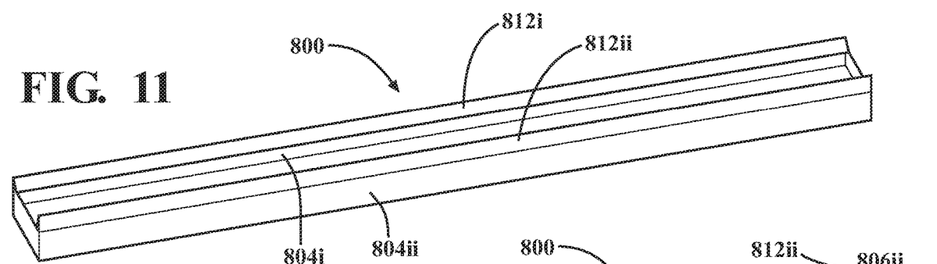
FIG. 11 is a top, perspective view of an alternate embodiment of the insert seen in FIGS. 9 and 10 including ribs on side walls of the insert.

With reference now to FIG. 11, an alternate embodiment of the insert (identified by the reference character 800) will be discussed. The insert 800 is identical to the insert 700 (FIGS. 9 and 10) but for the inclusion of ribs 812i, 812ii, and, accordingly, in the interest of brevity, will be described only with respect thereto.

The ribs 812i, 812ii facilitate securement of the insert 800 to the running board 2000 (FIGS. 9 and 10) via deflection, crushing, or other such deformation upon contact with the retainers 610, as discussed above in connection with the insert 700. Although shown as extending from (e.g., as being connected to) side walls 804i, 804ii of the insert 800, additionally, or alternatively, the ribs 812i, 812ii may extend from (e.g., may be connected to) end walls 806i, 806ii of the insert 200, which extend between the side walls 804i, 804ii, as seen in FIG. 12.

Figures 12, 13, 14, 15:
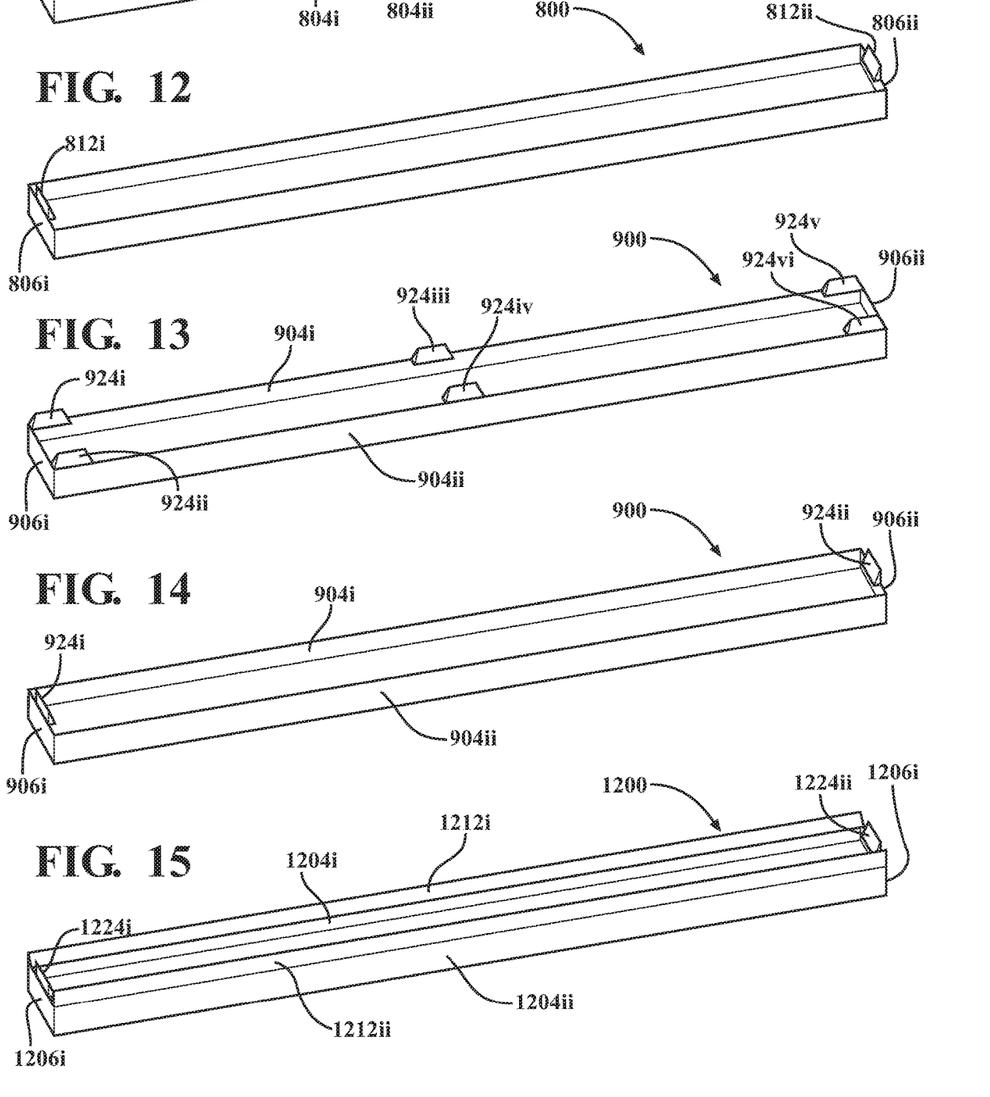
FIG. 12 is a top, perspective view of an alternate embodiment of the insert seen in FIGS. 9 and 10 including ribs on end walls of the insert.
FIG. 13 is a top, perspective view of an alternate embodiment of the insert seen in FIGS. 9 and 10 including spacers on side walls of the insert.
FIG. 14 is a top, perspective view of an alternate embodiment of the insert seen in FIGS. 9 and 10 including spacers on end walls of the insert.
FIG. 15 is a top, perspective view of an alternate embodiment of the insert seen in FIGS. 9 and 10 including ribs on side walls of the insert and spacers on end walls of the insert.

FIG. 13 illustrates another embodiment of the insert (identified by the reference character 900). The insert 900 is identical to the insert 700 discussed above but for the inclusion of spacers 924, and, accordingly, in the interest of brevity, will be described only with respect thereto.

The spacers 924 are configured for contact with inner surfaces of the retainers 610 so as to facilitate proper location of the insert 900. More specifically, the spacers 924 may be configured to create resistance and/or interference (friction) with the inner (front) surfaces of the retainers 610 (FIGS. 9, 10) so as to provide tactile feedback during installation of the insert 900 confirming that the spacers 924 are positioned in correspondence (e.g., general alignment) with the retainers 610. Although shown in the illustrated embodiment as including six spacers 924i-924vi (i.e., such that the spacers 924i, 924ii contact the retainer 610i, the spacers 924iii, 924iv contact the retainer 610ii, and the spacers 924v, 924vi contact the retainer 610iii), it should be appreciated that the particular number and/or location of the spacers 924 may be varied in alternate embodiments without departing from the scope of the present disclosure. For example, as seen in FIG. 14, it is envisioned that the spacers 924i, 924ii may extend from end walls 906i, 906ii of the insert 900, which connect the side walls 904i, 904ii, either instead of, or in addition to, the side walls 904i, 904ii, as seen in FIG. 13. As such, it is envisioned that the side walls 904i, 904ii and/or the end walls 906i, 906ii of the insert 900 may vary in height due to the inclusion of one or more of the spacers 924.

FIG. 15 illustrates another embodiment of the insert (identified by the reference character 1200). The insert 1200 is identical to the insert 700 (FIGS. 9 and 10) but for the inclusion of ribs 1212 and spacers 1224. In the illustrated embodiment, the ribs 1212i, 1212ii facilitate securement of the insert 1200 via engagement with the retainers 610 (FIGS. 9, 10), and the spacers 1224i, 1224ii facilitate proper location of the insert 1200 by providing tactile feedback during installation of the insert 1200, as discussed above.

While the ribs 1212i, 1212ii are shown as extending from (e.g., as being connected to) side walls 1204i, 1204ii of the insert 1200, and the spacers 1224i, 1224ii are shown as extending from (e.g., as being connected to) end walls 1206i, 1206ii of the insert 1200, it should be appreciated that the particular number and/or location of the ribs 1212 and the spacers 1224 may be varied in alternate embodiments without departing from the scope of the present disclosure. For example, embodiments in which the spacers 1224 extend from (e.g., are connected to) the side walls 1204i, 1204ii and the ribs 1212 extend from (e.g., are connected to) the end walls 1206i, 1206ii would not be beyond the scope of the present disclosure.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A running board for a vehicle, the running board comprising:
    a body including:
        a deck;
        an outer flange extending downwardly from the deck and including at least one opening forming a decorative element; and
        an inner flange extending downwardly from the deck in generally parallel relation to the outer flange;
    a plurality of retainers connected to the body so as to collectively define a receiving space; and
    an insert configured for insertion into the receiving space such that the insert engages the plurality of retainers to thereby secure the insert in generally parallel relation to the outer flange adjacent to the decorative element.

2. The running board of claim 1, further including a light source positioned adjacent to the insert such that the light source illuminates the insert upon activation.

3. The running board of claim 1, wherein the insert includes:
    an outer wall;
    a pair of side walls extending from the outer wall along a length of the insert; and
    a pair of end walls extending from the outer wall along a width of the insert so as to connect the pair of side walls.

4. The running board of claim 3, wherein the insert includes at least one rib extending from at least one of the end walls, the at least one rib including a deformable material such that the at least one rib is deformed upon insertion of the insert into the receiving space to thereby frictionally secure the insert in the receiving space.

5. The running board of claim 4, wherein the pair of end walls includes a first end wall and a second end wall positioned opposite the first end wall, the at least one rib including a first rib extending from the first end wall and a second rib extending from the second end wall.

6. The running board of claim 3, wherein the insert and the plurality of retainers are configured such that the insert is vertically insertable into, and removable from, the receiving space via movement along an insertion axis extending in generally parallel relation to a height of the running board during engagement with, and disengagement from, the plurality of retainers.

7. The running board of claim 6, wherein the insert includes an upper end portion and a lower end portion, the upper end portion being positionable adjacent to the deck upon connection of the insert to the body of the running board, the width of the insert increasing from the upper end portion to the lower end portion.

8. The running board of claim 7, wherein the insert includes a tapered transverse cross-sectional configuration, the receiving space being correspondingly tapered to prevent incorrect insertion of the insert into the receiving space.

9. The running board of claim 8, wherein the end walls of the insert are generally trapezoidal in configuration.

10. The running board of claim 8, further including at least one fastener configured to secure the insert in relation to the plurality of retainers.

11. The running board of claim 3, wherein the insert and the plurality of retainers are configured such that the insert is horizontally insertable into, and removable from, the receiving space via movement along an insertion axis extending in generally parallel relation to a length of the running board during engagement with, and disengagement from, the plurality of retainers.

12. The running board of claim 11, further including at least one fastener configured to secure the insert in relation to the plurality of retainers.

13. A running board for a vehicle, the running board comprising:
    a body including a deck configured to support a passenger during entry into and exit from the vehicle, the body defining at least one opening forming a decorative element; and
    an insert configured for engagement with the body in a single orientation such that the insert is positioned inwardly of the at least one opening and adjacent to the decorative element and such that the insert is oriented transversely in relation to the deck.

14. The running board of claim 13, wherein the body defines a receiving space configured to receive the insert, the receiving space and the insert including corresponding geometrical configurations.

15. The running board of claim 14, wherein the receiving space and the insert each taper inwardly along an axis extending towards the deck.

16. The running board of claim 14, wherein the insert includes a deformable material such that the insert is deformed during insertion into the receiving space to establish an interference fit between the insert and the body.

17. A running board for a vehicle, the running board comprising:
    a body including a deck configured to support a passenger during entry into and exit from the vehicle, the body defining a receiving space and at least one opening forming a decorative element; and
    an insert configured for insertion into the receiving space such that the insert is positioned inwardly of the at least one opening, wherein the receiving space and the insert include corresponding tapered configurations to inhibit improper insertion of the insert into the receiving space, wherein the body and the insert are configured such that the insert is advanced towards the deck during insertion of the insert into the receiving space and such that the insert is moved away from the deck during removal of the insert from the receiving space.

18. The running board of claim 17, wherein the insert includes a deformable material such that the insert is deformed during insertion into the receiving space to establish an interference fit between the insert and the body.

19. The running board of claim 17, wherein the receiving space and the insert each include a trapezoidal vertical cross-sectional configuration.

20. The running board of claim 17, further including a light source positioned adjacent to the insert such that the light source illuminates the insert upon activation.

\* \* \* \* \*